United States Patent [19]

Ogden et al.

[11] 4,242,007
[45] Dec. 30, 1980

[54] METHOD AND APPARATUS FOR DISPENSING WELDING FLUX

[75] Inventors: Ralph Ogden, 1304 Fisher St., Munster, Ind. 46321; John C. Colley, Schererville, Ind.

[73] Assignee: Ralph Ogden, Munster, Ind.; a part interest

[21] Appl. No.: 34,655

[22] Filed: Apr. 30, 1979

[51] Int. Cl.³ .................... B65G 53/36; B65G 53/40
[52] U.S. Cl. ................................ 406/109; 92/49; 92/50; 406/126
[58] Field of Search ............ 406/109, 124, 125, 126, 406/132, 169; 228/41; 92/48, 49, 50

[56] References Cited

U.S. PATENT DOCUMENTS

| | | | |
|---|---|---|---|
| 2,074,362 | 3/1937 | Bowen | 92/50 |
| 2,723,057 | 11/1955 | Golden | 406/126 X |
| 2,835,786 | 5/1958 | Launder et al. | 228/41 X |
| 3,644,003 | 2/1972 | Von Funk | 406/126 |
| 3,926,788 | 12/1975 | Stephens | 209/3 |

FOREIGN PATENT DOCUMENTS

562746  6/1975  Switzerland ............... 406/126

*Primary Examiner*—James L. Rowland
*Attorney, Agent, or Firm*—McWilliams, Mann & Zummer

[57] ABSTRACT

A method and apparatus for dispensing welding flux involving a flux supply and dispensing system comprising a tank assembly that includes an upper flux receiving chamber, a lower flux dispensing chamber, and a flux transfer chamber intermediate the upper and lower chambers. Flux is supplied to the flux receiving chamber either by a vacuum pick up arrangement or a suitable gravity or mechanical feed arrangement, and screened. The floors of the upper chamber and transfer chamber are each ported and equipped with separate plug valves arranged to move vertically to open and close with a plug type fit the respective ports for sequentially transferring a welding flux charge first from the upper chamber to the transfer chamber, and then from the transfer chamber to the lower dispensing chamber, under the control of a sealed pneumatic actuation system that keeps the flux from fouling the moving parts involved. Dispensing of the flux from the lower chamber is by way of either gravity feed or fluidized feed through a hose to the point of use.

6 Claims, 5 Drawing Figures

METHOD AND APPARATUS FOR DISPENSING WELDING FLUX

This invention relates to a method and apparatus for dispensing welding flux for use in welding operations, and more particularly, to a tank type flux handling system arranged to accept welding flux from a suitable source, such as by way of gravity or mechanical feed from a hopper, or by way of vacuum pick up of unused flux at the welding site, and provide flux as needed at the welding site, either by gravity feed or fludized flux flow from the tank.

Tank type flux supply or dispensing arrangements are available in the welding field involving a closed reservoir connected to a source of vacuum, and having a flexible hose for vacuum pick up of unused flux at the welding site, a suitable screening arrangement therefor to screen out used flux, and a lower hopper portion in which the picked up flux accumulates for gravity discharge therefrom through a flexible hose that is to convey the flux to the welding site. In simpler versions, the flux supply assembly is in hopper form for receiving a charge of fresh flux that is to be dispensed from the lower end of same in a suitable controlled manner as needed by the welder.

Regardless of the type of flux dispensing apparatus employed, existing systems have continued to present operational difficulties. Outfeed of the flux from the reservoir or hopper is frequently intermittent or irregular due to clogging problems, and supplemental equipment such as a vibrator is frequently required to insure uniform flux flow from the tank. Vibrators, in addition to adding to the cost of the equipment, produce noise pollution and the vibration provided may be objectionable from other standpoints, such as distributing the welding set-up involved.

While the particulate nature of welding flux makes it susceptible of being fluidized for pneumatic conveyance, and this approach would seem to be one that would improve flux dispensing from a reservoir sealed for that purpose, this requires pressuring the flux discharging part of the tank assembly involved, ordinarily at the lower end of the tank assembly, which would seem to introduce design complications since the flux would have to be transferred to the tank pressurized portion from the flux receiving portion of the tank, with the latter normally being under no greater than ambient pressure conditions, or possibly under vacuum conditions if vacuum pick up is employed. As the particulate nature of welding flux results in the flux itself all too readily fouling porting and control systems connected therewith or forming a part of the tank for flux handling purposes, tank systems employing pneumatic flux dispensing have not been generally satisfactory.

Furthermore, there is a long standing need in the welding field for a practical flux dispensing system of the recycling type that is operable on a continuous basis for pick-up of flux at the work piece and dispensing of welding flux back to the work piece, free of flux clogging and fouling problems that heretofore have required periodic shut down of the welding system to place the flux dispensing system in at least minimal working order.

The principal object of this invention is to provide a method and apparatus for dispensing welding flux or other materials of a like particulate composition that provides for continuous supply of the particular material involved, when desired, and involves operational controls within the tank assembly involved that are shielded or masked from fouling by the flux or other particulate material itself.

Another principal object of the invention is to provide a method and apparatus for dispensing welding flux involving a tank assembly that receives the flux to be supplied for welding purposes and passes it through the tank assembly using flux flow control valves that are designed to be free of fouling even though they directly control the flow of the flux, with the actuation system therefor being arranged to be fluid pressure operated by a pressurized fluid system that is sealed internally of the tank from fouling by or exposure to the flux.

Yet another principal object of the invention is to provide a flux dispensing tank arrangement equipped to subdivide the flux supplied to the tank into a charge of appropriate quantity or size, and transfer the charge through separate vertically consecutive chambers air lock fashion from the supply chamber of the tank into the dispensing chamber of the tank, so that the same basic tank assembly may have both gravity supply thereto and dispensing therefrom, or vacuum pick up supply thereto and fluidized conveyance dispensing therefrom, or alternate combinations of the same, as desired for particular applications.

Another important object of the invention is to provide a method and apparatus for dispensing welding flux that involves a pneumatic tank assembly of few and simple parts that may be operated directly from existing sources of plant pressurized air and vacuum source equipment.

Yet other objects of the invention are to provide a tank type flux dispensing apparatus that is economical of manufacture, reliable in operation, and arranged for ready incorporation in existing plant welding facilities.

In accordance with the invention, a flux dispensing system is provided comprising a tank assembly having an upper or top chamber for receiving the flux to be dispensed, a lower or bottom chamber from which the flux is to be dispensed, and a transfer chamber between the upper and lower chambers, in which a charge of the flux is formed, and from which the charge is transferred to the lower chamber. The upper or top chamber has a floor defining a discharge port opening into the transfer chamber and the transfer chamber has a floor defining a similar discharge port opening into the lower chamber. These ports each are equipped with a drop action plug valve member for closing same from below each with a plug fit, with the respective valve members each being supported, adjacent the discharge port to be closed thereby, by an upright actuator member to form a discharge port off-on valve device for the respective discharge ports.

In the case of each such plug valve, the actuator member therefor supports the plug valve from below through a vertically operating lost motion connection providing for limited downward movement of the actuator member relative to the plug valve member supported thereby, with the lost motion connections being arranged for preliminarily venting at a precontrolled rate through the respective plug valves the fluid pressures below them, where positive pressurized conditions are involved in a particular application, as part of the procedure of moving the respective actuator members from their upper closed positions toward their lower positions.

The respective valve members of each plug valve are equipped with ram means or devices secured thereto for moving the respective actuator members through a stroke between an upper position in which the respective actuator members hold the respective valve members against the respective ports to close same, and a lower position in which the respective valve members are disposed below and spaced from the respective ports to open said ports for flux flow therethrough about the respective plug valves. The ram means or devices involved each comprise a closed fluid cell sealed against entry into same of the flux material, and conduit means and fluid flow control means therefor that are connected to the respective cells for conducting fluid actuating material under pressure from the source therefor to and from the respective cells for effecting the strokes of the respective actuator members free of fouling by the flux.

In a preferred form of the invention the upper chamber of the tank assembly is connected to a source of vacuum, and is provided with a flexible conduit connected thereto for vacuum pick up of unused welding flux at the welding site for recycling of same through the tank assembly, and the tank lower chamber is connected to a source of gas under pressure such as air for fluidizing the flux for pneumatic conveyance therefrom through a flexible conduit leading to the welding site.

The plug valve actuating fluid cells are arranged for mounting in alignment with the respective plug valves and are operated in an opposite manner utilizing controls effecting a timing cycle that provides continuous operation of the flux pick-up and dispensing assembly while welding continues. As the apparatus operates under the automatic controls involved, the transfer chamber plug valve is closed and the upper chamber supply plug valve is opened to initially vent to the supply chamber the pressure conditions of the transfer chamber and then receive from the supply chamber a charge of the welding flux, after which the positioning of the plug valves is reversed to seal off the upper supply chamber from the transfer chamber, and open the transfer chamber to the discharge chamber, thereby first venting the pressure conditions of the lower dispensing chamber to the transfer chamber and then effecting a transfer of the flux charge from the transfer chamber into the lower dispensing chamber.

The plug valves and the controls therefor are arranged so that the valve opening and closing functioning of the plug valves is not effected by the presence of the welding flux, and the controls are fully masked or shielded from the welding flux so that the operational system of the tank is of the clean type and free from fouling by the flux.

The basic tank assembly involved is readily adaptable for different applications, as the flux receiving chamber may be arranged for gravity or mechanical feed of flux thereto instead of vaccum pick up, and the flux dispensing chamber may be of the simple gravity feed type. Further, the tank assembly will handle any particulate material of a free flowing nature, such as sand or other forms of grit.

Other objects, uses and advantages will be obvious or become apparent from the consideration of the following detailed description and the application drawings, in which like reference numerals are employed to designate like parts throughout the several views.

However, it is to be distinctly understood that the specific drawing illustrations provided are supplied primarily to comply with the requirements of the Patent Laws, and that the invention is susceptible of modifications and variations that will be obvious to those skilled in the art, and which are intended to be covered by the appended claims.

GENERAL DESCRIPTION

Figures 1, 1A:
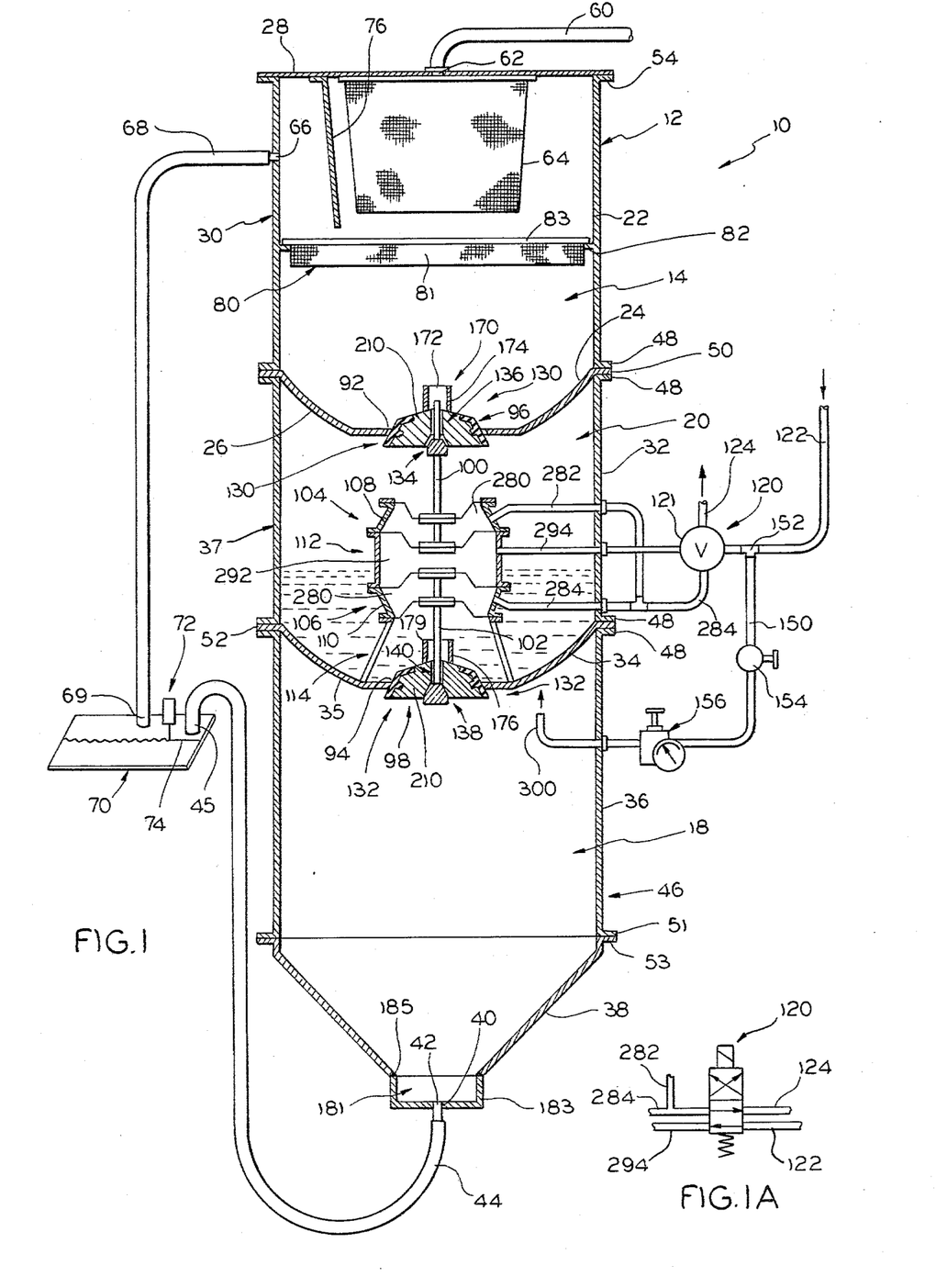
FIG. 1 is a diagrammatic vertical sectional view through a preferred tank assembly arrangement, illustrating the tank assembly arranged for flux vacuum pick up and fluidized pneumatic conveyance dispensing relative to a diagramatically illustrated work piece.
FIG. 1A schematically illustrates the air flow directional control valve type that may be used as the valve 120 in the showing of FIG. 1.
Figure 2:
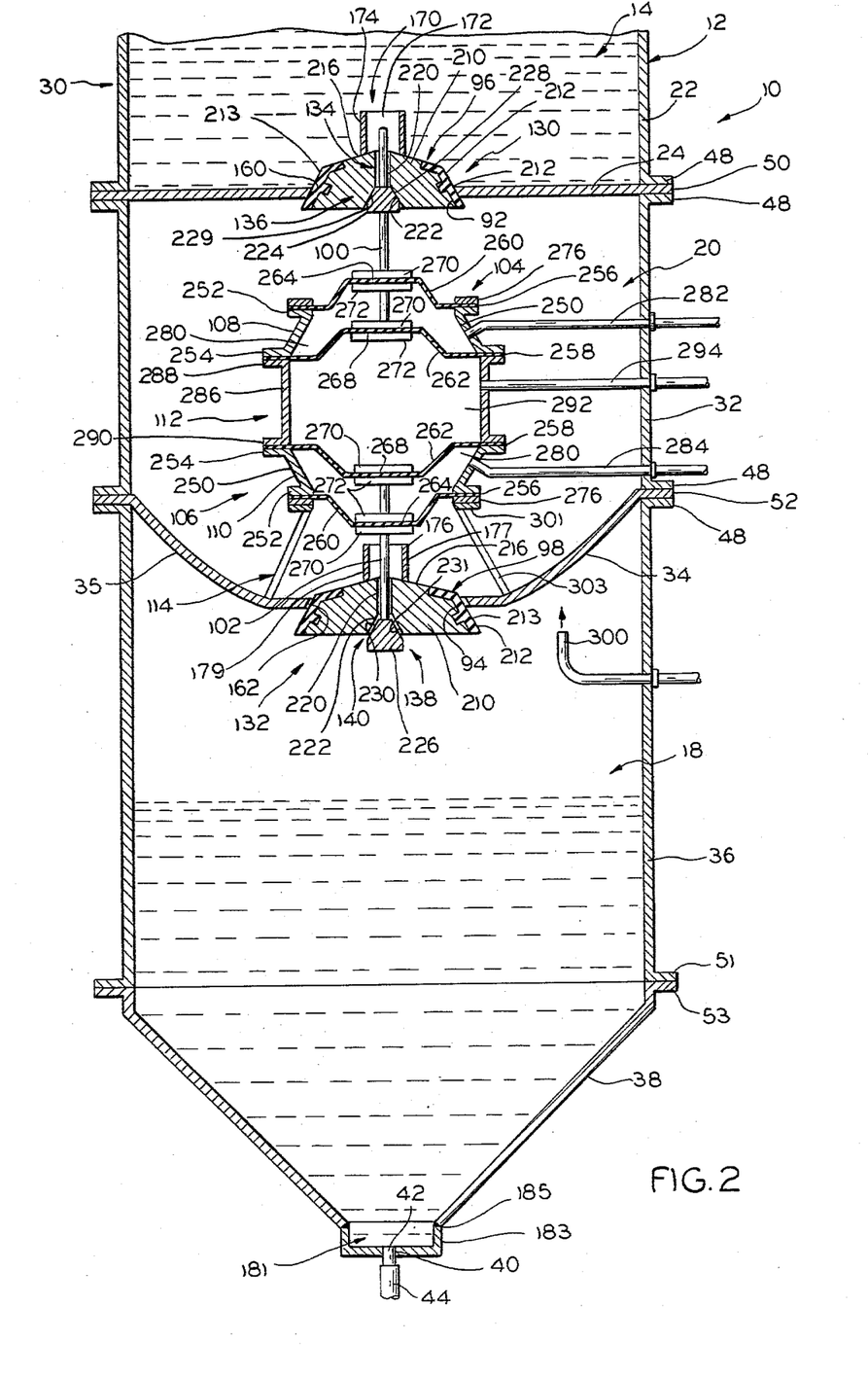
FIG. 2 is a fragmental view based on the showing of FIG. 1 but illustrating on a larger scale the tank valves and actuating arrangements therefor, as well as a minor modification of the tank assembly flooring.

Reference numeral 10 of FIGS. 1 and 2 generally indicates a tank assembly arranged in accordance with a preferred embodiment of the invention which comprises a tank structure 12 defining an upper or supply chamber 14 into which welding flux is to be supplied, a lower discharge chamber 18 from which the welding flux is to be discharged, and a transfer chamber 20 intermediate the supply and discharge chambers 14 in which the individual charges of welding flux are formed for air lock type transfer to the lower or dispensing chamber 18 for discharge therefrom under fluidized conveyance conditions.

In the specific embodiments illustrated, the chamber 12 is defined by cylindrical side wall 22, bottom wall 24 that may have a funneling portion 26 (FIG. 1) or be flat (FIG. 2), and a top wall 28 suitably secured together to form the supply container 30 that forms supply chamber 14.

The transfer chamber 20 is defined by cylindrical side wall 32, bottom wall 34 that is similar to bottom wall 24, and thus may have a funneling portion 35, or be flat (not shown), and the bottom wall 24 referred to above, to form the transfer container 37.

The dispensing lower chamber 18 is defined by cylindrical side wall 36 equipped in the forms illustrated in FIGS. 1 and 2 with a funnel shaped lower wall 38 of frusto conical configuration defining outlet 40 to which the tubular end fitting 42 of a flexible conduit hose 44 is suitably attached for conveying the flux to the point of use. The side wall 36 and the funneling wall 38 together with the end wall 34 referred to above form the lower or dispensing container 46.

In the forms illustrated in FIGS. 1 and 2, the containers 30, 37 and 46 are secured together in stacked relation, as by employing attachment bolts and suitable intervening seal means at their annular end flanges indicated at 48 between which the end flanges 50 and 52 of the respective floor walls 24 and 34 are interposed in the area of the transfer chamber 20. Cover 28 is suitably secured in sealing relation therewith to the upper end flange 54 of side wall 22. The supply container 30 is connected to a suitable source of vacuum by appropriate conduit 60 that has its connecting end 62 shielded by suitable filter 64. Fitting 66 suitably applied to side wall 22 has flexible hose 68 applied thereto to extend to the welding work piece 70 for vacuum pick up of unused welding flux left as the welding torch 72 is moved along the joint 74 to be welded. Baffle plate 76 is suitably affixed to the cover 28 between the fitting 66 and the filter 64 to protect the filter 64 from welding flux entering chamber 14 and deflect such flux into suitable screen 80 that is supported on the annular seat 82 that is provided within the chamber 14 for this purpose. The screen 80 is of a mesh suitable for screening welding flux to separate from the flux passing through the tank structure 12 that which has become fused by the welding operation.

In accordance with the present invention, the floors 24 and 34 are ported, as indicated at 92 and 94 respectively, to be closed by the respective plug valve members 96 and 98 that are respectively controlled by vertical movement of the respective actuating members 100 and 102 that are respectively actuated by the respective ram devices 104 and 106.

The ram devices 104 and 106 are in the nature of closed fluid cells 108 and 110 which, in the form of FIGS. 1 and 2, have been integrated into a fluid cell assembly 112 that is supported within chamber between the tank valves 96 and 98 on a suitable support, such as the tripod type support 114 that is only diagrammatically illustrated.

The actuator members 100 and 102 are moved vertically by the cell assembly 112 under the control of suitable four way control valve 120 that may be automatically controlled in any suitable manner to supply fluid under pressure, such as compressed air, from conduit 122 (that is connected to, for instance, a plant compressed air supply), with the valve 120 controlling the flow of the air under pressure between conduit 122 and vent pipe 124 in a manner that will move the actuator members 100 and 102 in an equal but opposite manner for opening and closing of the ports 92 and 94.

The valve 96 and its actuator member 100 form plug valve device 130, while the valve member 98 and its actuator member 102 form plug valve device 132.

The actuator member 100 has a lost motion connection with its valve member 96, generally indicated at 134 and provides a venting type pilot valve indicated at 136.

As to the valve device 132, the actuator member 102 thereof has a lost motion connection with its valve member 98 that is generally indicated by reference numeral 138 and forms therewith a venting type pilot valve 140.

In the routine operation of the assembly 10, welding flux is supplied to the supply chamber 14 through pick up hose 68 under the source of vacuum applied to the chamber 14 by conduit 60. The lower or dispensing chamber 18 is pressurized for fluidized flow of flux therefrom through hose 44 to the work piece 70 independently of the operation of valve 120, as, for instance, via conduit 150 extending between a suitable connection 152 to conduit 122 (upstream of valve 120) and the chamber 18, through suitable off-on valve 154 and pressure regulator 156.

The four way control valve 120 (which may be of the single solenoid-spring return type that is schematically illustrated in FIG. 1A) is suitably alternately positioned, as by employing the indicated solenoid actuated spring return operation, to alternately open and close the valve devices 130 and 132 by disposing them in the alternate positions shown in FIGS. 1 and 2, respectively.

In the showing of FIG. 1, the valve device 132 is pneumatically held closed while the valve device 130 is pneumatically opened and held open to receive from the chamber 14 through the port 92, about the valve member 96, a charge of the welding flux that accumulates at the lower end of the chamber 20. FIG. 2 illustrates the reversing positioning involved, to open valve device 132, and close valve device 130, to pass the flux charge from chamber 20 to chamber 18.

In this connection, it is to be noted that, in accordance with the invention, the valve members 96 and 98 are supported from below for vertical movement against the respective valve seats 160 and 162 in closing the ports 92 and 94. When the actuator members 100 and 102 are moved downwardly by the respective cells 108 and 110, the pilot valves 136 and 138 open to provide a preliminary venting through the respective valve members 96 and 98 of the pressure conditions on the lower sides of same, after which the action of gravity moves the respective valve members 96 and 98 to their lowered, port opening, positions that are illustrated in the drawings.

It is preferred that the tank assembly 10 be arranged for the supply of welding flux therefrom in a continuous uninterrupted manner for welding purposes, and for this purpose, the valve 120 is arranged to operate in a suitable timing cycle to alternately discharge a charge of welding flux from the chamber 14 into the chamber 20, and then discharge such welding flux charge from the chamber 20 into the chamber 18. A timing cycle of two minutes, with the respective valves alternating between their respective closed and open positions for one minute each, is preferred.

Thus, in this manner of operation, the valve device 130 is opened when the valve device 132 is closed; the pilot valve 136 initially opens to vent to the chamber 14 the pressure conditions within the chamber 20, with the air flow being directed upwardly of the chamber 14 by suitable shroud 170 providing an imperforate side wall 174. With the preliminary venting of the pressure conditions of chamber 20 into chamber 14, gravity acting on the valve member 96 drops same to its open condition of FIG. 1 for gravity flow between the valve member 96 and valve seat 160 of the particulate material making up the welding flux. The air flow against screen 80 tends to break up any tendencies of the flux to bridge over screen 80.

At the next stage of the timing cycle, the positioning of the valves 130 and 132 reverses, with the valve 130 moving into its closed position of FIG. 2 and the valve 132 moving to its open position of FIG. 2, while operating in a similar manner as valve 130 in opening. Thus, the pilot valve 138 opens preliminarily to vent the pressure conditions of chamber 18 to the transfer chamber 20, after which gravity acting on the valve member 98 drops same to the open position of FIG. 2 for discharge of the flux in chamber 20 in an annular manner between the valve seat 162 and the valve member 98 into chamber 18. Valve 138 is protected by cylindrical shroud 176 having imperforate side wall 177 to keep same free of the welding flux.

The wall 38 of dispensing chamber 18 is preferably formed to define a sump 181 about outlet 40, as by welding dished member 183, in which outlet 40 is formed to wall 38, as at 185. Sump 181 has been found to facilitate the fluidizing of the flux for conveyance through conduit hose 44, and especially for tank assemblies having multiple outlets, as illustrated by the showing of FIG. 2.

Figure 3:
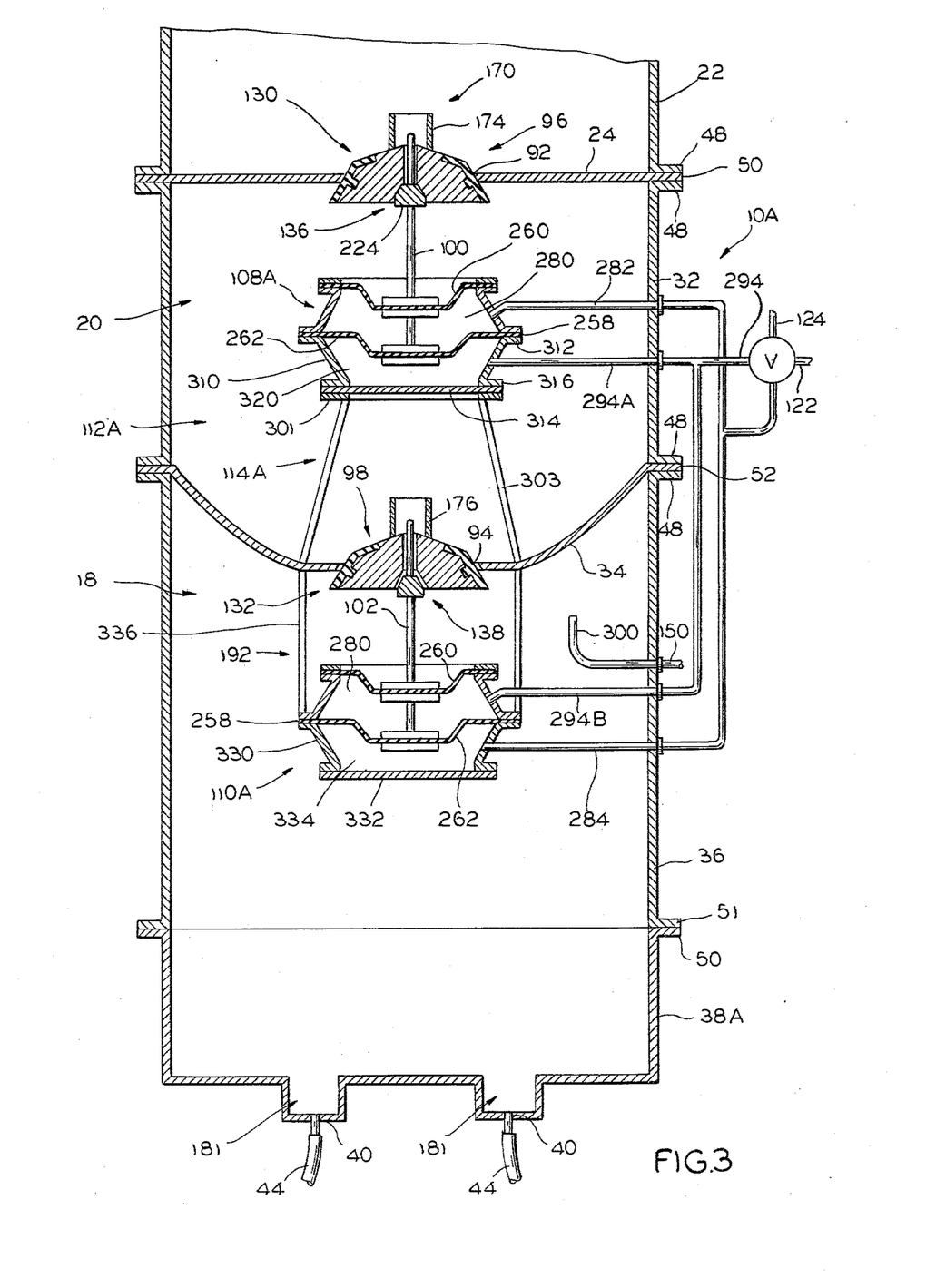
FIG. 3 is a view similar to that of FIG. 2, and illustrating a modified form of the invention.

In the tank assembly 10A of FIG. 3, the plug valve devices 130 and 132 are essentially the same as in the tank assembly 10. However, their operating cells 108A and 110A are physically separated in the arrangement of cell assembly 112A, with the air cell 108A being within the transfer chamber 20 and the air cell 110A within the dispensing chamber 18. The cell 108A is shown for illustrative purposes as being supported on a suitable tripod type support 114A (suitably fixed in place), while the air cell 110A is suspended from the floor 34 by a suitable supporting framework 192. The cells 108A and 110A are operated in the same manner that is referred to in connection with the assembly 112. As is also shown in FIG. 3, the tank assembly outlet wall structure need not be funnel shaped, but may be essentially flat, as illustrated by wall 38A. The tank assembly may also be arranged to supply flux to several welding stations, and FIG. 3 shows wall 38A formed to include several of the diagrammatically illustrated sumps 181 and associated outlets 40 and conduit hoses 44.

Figure 4:
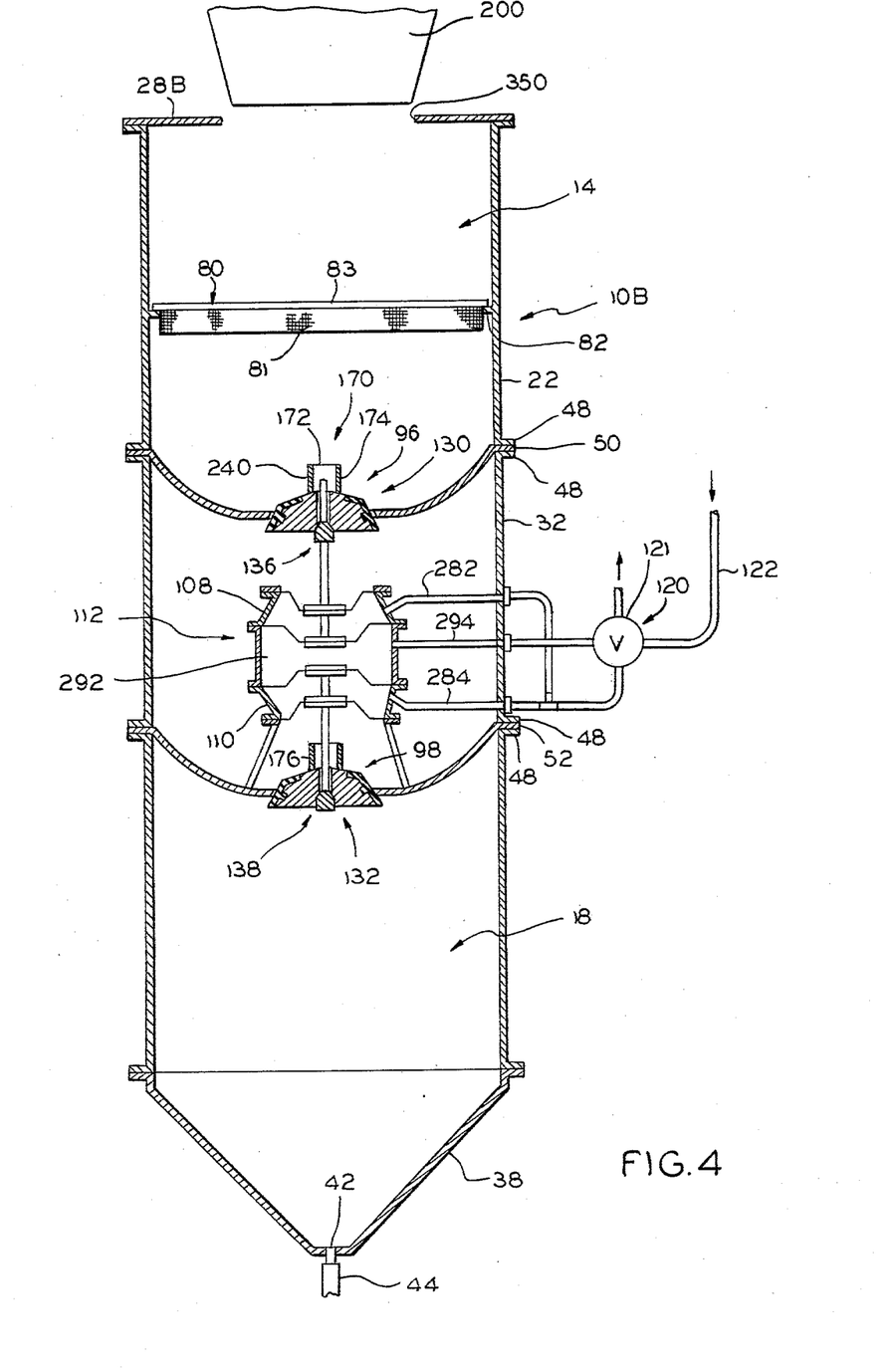
FIG. 4 is a view similar to that of FIG. 1, but illustrating a simplified tank assembly arrangement.

In the tank assembly 10B of FIG. 4, the supply chamber 14 is of simplified form and is arranged to receive the welding flux in gravity flow form from suitable hopper 200. The dispensing chamber 18 is of the simple gravity discharge type, with the fluidizing air supplying conduit 150 of FIGS. 1 and 2 being omitted so that the flux discharges by gravity from chamber 18 through conduit 44 to the point of use.

SPECIFIC DESCRIPTION

The side walls 22, 32 and 36, the floors 24 and 34, and the funnel section 38 as well as top 28 may be formed from sheet metal or the like. The flanges 48 are suitably clamped or bolted to the respective flanges 50 and 52 of floors 24 and 34, with suitable fluid seals employed therebetween. Similarly, the lower flange 51 of the side wall 36 is made fast to end flange 53 of funneling section 38 (as welding, bolting or the like), and the cover 28 is suitably clamped or bolted to flange 54 of side wall 22, with suitable seals being employed at these points. Annular flange 82 may be suitably welded in place on the inside surface of side wall 22 and proportioned to receive the depending body 81 of screen 80 and support the flange 83 thereof on same.

The tank assembly is also suitably sealed at the fittings 42, 62, and 66, and where the conduits, for operating valve devices 130 and 132 and for communicating to chamber 18 the fluidizing air, enter assembly 10, whereby the assembly 10 is essentially fluid leakage free.

The bottom walls or floors 24 and 34 may be flat if desired for simplicity as when the flux initially passes through the tank assembly it banks at its pile angle about ports 92 and 94, and thereafter the flux flow through the ports 92 and 94 (when they are open) is fully effective. The floor of the outlet or dispensing chamber 18 may be similarly flat for the same reason, sumps 181 being provided for flux fluidizing purposes in those embodiments where the flux discharge from the tank assembly is to be fluidized.

The filter 64 may be of any suitable type and in the form illustrated is a cloth filter secured to a suitable frame (not shown) suitably anchored on the cover 28 about the intake end fitting 62 of conduit 60 (which is connected to a source of vacuum that for purposes of the invention may be on the order of 30 inches of water gauge vacuum).

Deflector 76 is a planar plate extending across chamber 14 between the filter 64 and the discharge end fitting 66 of flux recovery hose 68.

The flexible hoses 44 and 68 are only diagrammatically illustrated and it is assumed that the intake end 69 of hose 68 and discharge end 45 of hose 44 will be mounted to move with the torch 72 to the right of the work piece 70, or these parts can be operably associated with a fixed mounting arrangement and provision can be made to move the work piece 70 to the left of FIG. 1.

The plug valves 96 and 98 per se are similar, each comprising in the form illustrated a body 210 formed from a suitable metallic material to define frusto conical edge surface portion 212 that is equipped with a liner 213 formed from an elastomeric material such as rubber that cooperates with the complementary shaped valve seats 160 and 162, respectively, when the respective valves 96 and 98 are in their closed positions, to seal off the respective ports 92 and 94. Alternately, a suitable O-ring seal arrangement for this purpose, may be employed (not shown).

The bodies 210 are formed with a frusto conical crown 216 so that the flux will gravitate downwardly about the margins of the respective bodies 210 when the valves 96 and 98 are in their open positions.

The bodies 210 are each formed to define an upper centrally located bore 220 that respectively merge into a lower frusto conical cavity 222 aligned therewith that respectively cooperate with the plug bodies or elements 224 and 226 that are fixed to the respective actuating members 100 and 102. The plug bodies or elements 224 and 226 are formed with the respective frusto conical surfaces 228 and 230 that respectively complement the respective internal frusto-conical surfaces 229 and 231 of the respective cavities 222 for sealing engagement therewith when the bodies 210 are supported by the respective actuating members 100. Thus, it is contemplated that when the respective valve bodies 210 are pressed into their port closing positions, the plug bodies 224 and 226 will seal off the bores 220.

The actuating members 100 and 102 have their portions that lie within the respective bores 220 proportioned to define an annular passage thereabout, which, when the actuating members are moved to their lowered positions, provide limited fluid communication between the upper and lower sides of the valve bodies 210 through the respective pilot valves 136 and 138 formed thereby. This spacing in a preferred embodiment is on the order of 1/16th to 1/8th of an inch about the margins of the respective actuating member portions lying within the bores 220.

The shroud 170 of the upper tank valve 96 is affixed thereto by employing welding and comprises the sleeve 172 defined by side wall 174 through which fluid under pressure discharging through the pilot valve 136 in a throttling like manner, when the actuating member 100 is initially moved to its lower position, passes upwardly into the chamber 14. The shroud 170 shields bore 220 of valve 96 from flux that accumulates about valve 96 while permitting gas discharge from valve 136 into chamber 14 preliminarily to the opening of valve 96.

Shroud 176 of valve 98 comprises sleeve 179 suitably affixed to the 216 of the lower valve body 210; shroud 176 serves primarily to keep the welding flux that accumulates around the crown 216 of valve 98 from entering the bore 220 of the lower body 210. In this connection, it is to be noted that the flux that passes downwardly about fluid cell assembly 112 is deflected away from sleeve 179 by the presence of assembly 112 under which valve 98 is centered.

The cells 108 and 110 are similar but are oriented to operate in an inverse manner. Each comprises an annular body member 250 defining end flanges 252 and 254 against which are clamped the rims 256 and 258 of the respective diaphragms 260 and 262 that have their mid portions 264 and 268 respectively anchored to the respective actuating members 100 and 102, as by being clamped between discs 270 and 272 that are suitably fixed to the respective actuating members. The smaller diameter diaphragms 260 have their rims 256 anchored to the flanges 252 of the respective bodies 250, as by employing anchoring rings 276 suitably secured in place. In each cell 108 and 110, the smaller diameter diaphragm 260 and the larger diameter diaphragm 262 together with housing 250 define gas chamber 280 that is supplied with gas, such as air, under pressure by conduit 282 in the case of cell 108, and conduit 284 in the case of cell 110.

In the tank assembly 10 of FIGS. 1 and 2, the cells 108 and 110 are integrated to define the cell assembly 112 and for this purpose a central joining annular frame member 286 is provided equipped with end flanges 288 and 290 to which the margins 258 of the respective larger diaphragms 262 are suitably clamped in leak free relation therewith, to define a central or common gas chamber 292 that is communicated with by conduit 294.

As indicated in FIG. 1, the conduits 282 and 284 in the form of FIGS. 1 and 2 are connected together so that they are either commonly exposed to the source of air under pressure or they are simultaneously vented, or connnected to vent pipe 124, by the operation of valve 120. Conduit 294 and conduits 282 and 284 are operably associated with the valve 120 (diagrammatically represented in FIG. 1 by rotor 121) so that conduit 294 is connected to the vent pipe 124 when conduits 282 and 284 are connected to the source of air under pressure, and vice versa. Thus, in the operation of the integrated air cell assembly 112, when the valve 120 is positioned to connect conduits 282 and 284 to the air pressure source represented by conduit 122, chamber 292 is vented through valve 120 and vent pipe 124, whereby actuator 100 is moved downwardly and actuator 102 is moved upwardly, due to the larger areas that the diaphragms 262 have that are exposed to the respective chambers 280. This opens the pilot valve 136 of the valve 130, preliminary to the opening of the valve member 96, and closes both valve 132 and its pilot valve 138 by drawing valve member 98 against its valve seat 162 through actuating member 102 and the engagement of plug body 226 with valve member 98, in its cavity 222.

When the position of the valve 120 reverses, so that the conduits 282 and 284, and thus chambers 280, are vented, and conduit 294 is connected to the air pressure source, chamber 292 is pressurized, with the result that the actuators 100 and 102 move in the opposite directions under the gas pressure acting on the respective diaphragms 262 that define the chamber 292. This moves the actuator 100 upwardly to close the valve 130 by lifting the valve member 96 against its valve seat 160, and opens pilot valve 138 of the valve 132 preliminary to the dropping of the valve member 98 under gravity after the pressurized conditions within the chamber 18 have been vented to chamber 20 by throttling through the bore 220 of the valve member 98 into the transfer chamber 20.

It will be seen that when chambers 280 of cell assembly 112 are pressurized and chamber 292 is vented, the fluid pressure acting on the larger diaphragm 262 dominates, and thus actuator members 100 and 102 move linearly away from each other; when chamber 292 is pressurized and chambers 280 are vented, while the larger diaphragm 262 is again made operative to shift actuators 100 and 102 linearly, the movement is in the opposite directions.

The conduits 282, 284, 294 and 150 are suitably connected to the tank side walls indicated for adequate sealing where they pass through the respective side walls, as already indicated. The conduit 150 has its discharge end 300 upwardly directed against the underside of the floor 34 for maximum dispersion of the incoming gas flow into the chamber 18.

The off-on valve 154 and the gas regulator 156 may be of any suitable conventional type, it being preferred that for flux fluidizing purposes the chamber be exposed to a pressure lying in the range of from approximately 10 to approximately 30 psig. Valve 120 may be any suitable commercial form of solenoid operated four way control valve; while a single solenoid, return spring return type valve is indicated in the showing of FIG. 1A, this is for reasons of simplicity, as similar control valves of the double solenoid type may also be employed. Where the valve type of FIG. 1A is employed, it is immaterial which position the valve spool is spring biased to.

The support 114 comprises support ring 301 on which the respective cells 108 and 108A are suitably mounted (where supports 114 are employed), with rings 301 in turn having suitable spaced apart support legs 303 that engage the chamber flooring on which the indicated cells rest and that are suitably fixed in place, as by welding. Supports 114 may be replaced by any other equivalent structure suitable for mounting the indicated cells in operating position.

In the tank assembly 10A (see FIG. 3), the cell 108A of cell assembly 112A is the same as the cell 108 except it is provided with the flanged end housing 310 to which the margin 258 of diaphragm 262 is sealingly secured at the end flange 312, with the other end of the housing 310 being closed by end plate 314 that is fixed to the other end flange 316 of the housing 310 in fluid sealing relation thereto. The diaphragm 262, housing member 310, and end plate 314 define chamber 320 that serves the function of chamber 292 insofar as cell 108A is concerned. Cell 108A is suitably supported on tripod type support 114A in the form of FIG. 3, which support has the indicated support ring 301 and legs 303.

The cell 110A is inverted from its position of FIGS. 1 and 2 and has annular housing 330 sealingly affixed to the margin 258 of its larger diaphragm 262. Housing member 330 is closed by end plate 332 to form gas chamber 334 that is comparable to chamber 320 and serves the purpose of chamber 292. Air cell 110A is suitably suspended from floor plate 34 by employing a suitable number of support rods 336 suitably secured in place. Conduit 284 is connected to chamber 334 of cell 110A due to the reverse positioning of cell 110A.

Thus, the cells 108A and 110A are physically separated from each other, in the cell assembly 112A.

The conduits 282 and 284 of cell assembly 112A are supplied simultaneously with gas under pressure or vented as in the embodiment of FIGS. 1 and 2, while conduit 294 is branched to form branches 294A and 294B to simultaneously supply gas to or vent chamber 320 of cell 108A and the chamber 280 of cell 110A through valve 120, depending on the setting of the valve 120, to obtain the indicated opposite linear movement action of members 100 and 102, respectively. Thus, in the embodiment of FIG. 3, both the valve members 96 and 98 are operated from below their respective ports 92 and 94.

The tank assembly 10A is otherwise the same as assembly 10, other than the aforedescribed floor section 38A of chamber 18, which is shown to have a generally flat bottom or floor portion 333 formed to define several sumps 181 to which the respective conduits 44 are connected for conveying fluidized flux to several points of use.

Tank assembly 10B has already been described, it involving the same valving and controls therefor as in the embodiment of FIGS. 1 and 2, but simplified as indicated in FIG. 4 to receive the flux from a hopper 200 by gravity feed through suitable inlet port 350 formed in cover 28B. Conduit 150 is eliminated so that dispensing chamber 18 is of the gravity feed type. Tank assembly 10B is otherwise the same as tank assembly 10. The hopper is supplied with fresh flux by direct manual application thereto, or by a suitable mechanical or other type feed arrangement, or the like.

As to all the embodiments of FIGS. 1-3, the conduit 122 connected to the source of compressed air preferably provides compressed air in the range of 80 to 100 psig. that is reduced to the 10 to 30 psig. range by operation of the pressure regulator valve 156.

The pilot valves 136 and 138 in operating have a pressure bleeding action that will last in the range of 10 to 15 seconds before the pressure will be sufficiently equalized across respective valves 130 and 132 so that valve members 96 and 98 will drop to the open position, as the valves 130 and 132 alternate between open and closed positions, in the internally pressurized arrangements of FIGS. 1-3. In the simplified arrangement of FIG. 4, the lost motion connections 134 and 138 do not function as pilot valves as there is insignificant pressure differentials between the tank chambers the valve members 96 and 98 separate.

It will be seen that the valve actuators 100 and 102 are actuated through air cell arrangements in which the interior of the air cells is completely sealed from fouling by the welding flux or other particulate material handled, with the diaphragms 260 and 262 being in the nature of static seals, as distinguished from sliding or dynamic seals. Further, the fluid under pressure actuating the actuator member 100 and 102 is fully masked or separated from those spaces that will be occupied or exposed to the flux, so that the motivating air system provided is of a clean type, that is free from fouling by the flux.

The nature of the plug valve members 96 and 98 is such that they provide a good sealing contact with the respective valve seats 160 and 162 under the holding action provided by the respective actuator members 100 and 102, even though they are exposed to the particulate matter that makes up the welding flux. The welding flux in passing through the respective ports 92 and 94 flows downwardly about the respective valve members 96 and 98 in an annular curtain. In the case of the chamber 20 of assembly 10, the flux thus falls about the air cell assembly 112 to collect at the bottom of the chamber 20 for passage into the chamber 18 when the valve 98 is open. The diaphragms 260 may be exposed to the welding flux since they have no sliding seal functions to perform but act as static seals that flex as they change shape in use.

The basic flux handling arrangement and method described and illustrated may also be employed to dispense other types of particulate matter, such as sand and the like. Thus, the arrangements of FIGS. 1-3 are suitable for dispensing sand or grit for sand or grit blasting purposes, though, for blasting purposes regulator 156 would be used at its full open position or omitted so that the full motivating energy of the incoming air would be available for motivating the particulate material involved.

The cell assemblies 112 and 112A also are useable separate and apart from the flux dispensing apparatus illustrated, with the cells 108, 108A and 110, 110A being separately useable, or in their indicated groups, as linear actuators where back and forth linear actuation of parts is desired. For any such purposes the lack of troublesome sliding or dynamic seals and journalling bearings, plus their ability to provide linear movement in opposite directions are significant advantages.

It will be apparent that tank assemblies arranged in accordance with the invention may have more than one set of the fluid cell assemblies 112 or 112A and the valve devices 130 and 132 operated thereby, with such sets operating in parallel relation as for serving multiple tank assembly outlets of the type suggested in FIG. 3. Also, in an arrangement such as is shown in FIG. 3, each sump 181 may be served by its own cell assembly 110A and valve device 132 operated thereby.

The foregoing description and the drawings are given merely to explain and illustrate the invention and the invention is not to be limited thereto, except insofar as the appended claims are so limited, since those skilled in the art who have the disclosure before them will be able to make modifications and variations therein without departing from the scope of the invention.

We claim:

1. In apparatus for dispensing particulate material including a tank structure having an upper chamber for receiving the material to be dispensed, and a lower chamber to which a charge of the material to be dispensed is passed from the upper chamber and having a lower outlet from which such material is passed in dispensing same from the apparatus, the improvement wherein:
   the tank structure includes a transfer chamber between said upper and lower chambers,
   said upper chamber having a floor defining a discharge port opening into said transfer chamber,
   said transfer chamber having a floor defining a discharge port opening into said lower chamber,
   said ports each having a drop action valve member for closing same from below each,
   said valve members each being supported adjacent the discharge port to be closed thereby by an upright actuator member to form a discharge port off-on valve device for the respective discharge ports,
   with the actuator member of the respective valve devices supporting the valve member thereof from below same through a vertically operating lost motion connection providing for limited downward movement relative to the valve member supported thereby, said valve devices each including ram means secured to the actuator member thereof for moving the respective actuator members through a stroke between an upper position in which the respective actuator members hold the respective valve members against the respective ports to close same and a lower position in which the respective valve members are disposed below and spaced from the respective ports to open said ports, said ram means each comprising:

a closed fluid cell sealed against entry into same of the particulate material, conduit means and fluid flow control means therefor connected to said cell for conducting fluid under pressure from a source therefor to and from said cell for effecting the strokes of the respective actuator members, with the lower chamber being connected to a source of fluid under pressure for fluidized discharge of the particulate material therein therefrom through the outlet thereof, said fluid flow control means including means for effecting said strokes of said actuator members in opposite directions in accordance with a predetermined timed sequence sequentially passing the particulate material charge from the upper chamber to the transfer chamber while said transfer chamber floor port is closed by said tank valve member thereof, and then passing the particulate material charge from the transfer chamber to the lower chamber while said upper chamber floor port is closed by said tank valve member thereof, said lost motion connections of the respective valve devices including means for preliminarily venting at a predetermined controlled rate through the respective tank valves the fluid pressures below them when the respective actuator members are moved from their upper positions toward their lower positions, said fluid cells each comprising;

diaphragm means anchored centrally thereof to the said actuator member to be actuated thereby, and housing means in which said diaphragm means is mounted, said diaphragm means defining rim portions anchored to said housing means in fluid tight sealing relation thereabout, and static seal means for effecting a fluid tight seal between said actuator member and said housing of the respective fluid cells, said diaphragm means of the respective fluid cells further comprising:

a pair of diaphragms in spaced apart relation, with one of the diaphragms comprising said static seal means, and the other diaphragm being of larger area than said one diaphragm, said conduit means of each cell having connecting to the space on either side of said other diaphragm.

2. The improvement set forth in claim 1 wherein: the lower chamber is formed to define a sump in which the lower chamber outlet is located.

3. A fluid cell for effecting linear movement of an actuator member to be so moved, said cell comprising:

diaphragm means anchored centrally thereof to the said actuator member to be actuated thereby, and housing means in which said diaphragm means is mounted, said diaphragm means defining rim portions anchored to said housing means in fluid tight sealing relation thereabout, static seal means for effecting a fluid tight seal between said actuator member and said housing means, said diaphragm means comprising:

a pair of diaphragms in spaced apart relation, with one of the diaphragms comprising said static seal means, and the other diaphragm being of larger area than said one diaphragm, said diaphragms and said housing means defining one fluid pressure actuation chamber on one side of said other diaphragm, enclosure means on the other side of said other diaphragm for defining a second fluid pressure actuation chamber, and means for alternately actuating and venting said chambers in oppositely acting relation for effecting linear movement of the actuator member, including conduit means for each said fluid pressure actuation chamber having connection to the space of same.

4. A fluid cell arrangement for effecting linear movement of a pair of aligned rectilinear actuator members in spaced apart relation, said cell arrangement comprising:

ram means secured to each actuator member, said ram means each comprising:

a closed fluid cell sealed against entry into same of particulate material, said fluid cells each comprising:

diaphragm means anchored centrally thereof to the said actuator member to be actuated thereby, and housing means in which said diaphragm means is mounted, said diaphragm means defining rim portions anchored to said housing means in fluid tight sealing relation thereabout, static seal means for effecting a fluid tight seal between said actuator member and said housing means of the respective fluid cells, said diaphragm means of the respective fluid cells further comprising:

a pair of diaphragms in spaced apart relation, with one of the diaphragms comprising said static seal means, and the other diaphragm being of larger area than said one diaphragm, said diaphragms and said housing means of the respective cells defining one fluid pressure actuation chamber on one side of said other diaphragm thereof for the respective cells, enclosure means on the other side of said other diaphragm for defining a second fluid pressure actuation chamber for the respective cells, and means for alternately actuating and venting said chambers of said cells in oppositely acting relation for simultaneously effecting linear movement of said actuator members, including conduit means for each said fluid pressure actuation chambers, of the respective cells, having connection to the space of same.

5. A fluid cell for effecting linear movement of a rectilinear actuator member longitudinally thereof, said cell comprising:

diaphragm means anchored centrally thereof to the said actuator member to be actuated thereby, and housing means in which said diaphragm means is mounted, said diaphragm means defining rim portions anchored to said housing means in fluid tight sealing relation thereabout, static seal means for effecting a fluid tight seal between said actuator member and said housing means, said diaphragm means comprising:

a pair of diaphragms in spaced apart relation, with one of the diaphragms comprising said static seal means, said diaphragms and said housing defining one fluid pressure actuation chamber on one side of the other diaphragm, said other diaphragm being of larger area than said one diaphragm, enclosure means on the other side of said other diaphragm for defining with said other diaphragm a second fluid pressure actuation chamber, and means for alternately pressurizing and venting said chambers in oppositely acting relation for effecting linear movement of the actuator member in either direction longitudinally thereof, whereby when said second chamber is pressurized, said first chamber is vented and the actuation member is moved away from said second chamber, and when said first chamber is pressurized, said second chamber is vented and the actuation member is moved toward said second chamber under the dominating pressure acting on said other diaphragm.

6. A fluid cell arrangement for effecting linear movement of a pair of aligned rectilinear actuator members in spaced apart relation, said cell arrangement comprising:

ram means secured to each actuator member, said ram means each comprising:

a closed fluid cell sealed against entry into same of particulate material, said fluid cells each comprising:

diaphragm means anchored centrally thereof to the said actuator member to be actuated thereby, and housing means in which said diaphragm means is mounted, said diaphragm means defining rim portions anchored to said housing means in fluid tight sealing relation thereabout, static seal means for effecting a fluid tight seal between said actuator member and said housing means of the respective fluid cells, said diaphragm means of the respective fluid cells further comprising:

a pair of diaphragms in spaced apart relation, with one of the diaphragms comprising said static seal means of the respective cells, said diaphragms and said housing means of the respective cells defining one fluid pressure actuation chamber on one side of the other diaphragm thereof for the respective cells, said other diaphragm of the respective cells being of larger area than said one diaphragm thereof, enclosure means on the other side of said other diaphragm of the respective cells for defining with said other diaphragm of the respective cells a second fluid pressure actuation chamber for the respective cells, and means for alternately pressurizing and venting said first and second chambers of said cells in oppositely acting relation for simultaneously effecting linear movement of said actuator members longitudinally thereof.

* * * * *